United States Patent [19]

Staudenrausch et al.

[11] 4,434,527
[45] Mar. 6, 1984

[54] SAUSAGE SKIN STORAGE AND FEEDER APPARATUS FOR A SAUSAGE STUFFING MACHINE

[75] Inventors: Georg Staudenrausch, Rissegg; Hans-Ernst Weerth, Winterstettenstadt, both of Fed. Rep. of Germany

[73] Assignee: Albert Handtmann GmbH & Co., Biberach, Fed. Rep. of Germany

[21] Appl. No.: 265,897

[22] Filed: May 21, 1981

[30] Foreign Application Priority Data

May 24, 1980 [DE] Fed. Rep. of Germany ....... 3019981

[51] Int. Cl.³ .................... A22C 11/00; B65G 41/12
[52] U.S. Cl. ........................................ 17/33; 198/560; 198/616
[58] Field of Search ............... 17/33, 49; 198/557, 198/616, 550, 551, 560

[56] References Cited

U.S. PATENT DOCUMENTS

| 2,159,851 | 5/1939 | Hicks | 198/557 X |
| 2,209,340 | 7/1940 | Landry | 198/557 X |
| 3,191,222 | 6/1965 | Townsend | 17/33 |
| 3,468,407 | 9/1969 | Fürst | 198/557 X |
| 3,477,559 | 11/1969 | Raasch | 198/616 X |
| 3,672,001 | 6/1972 | Greider | 17/33 |
| 4,220,238 | 9/1980 | Shavit | 198/560 X |

FOREIGN PATENT DOCUMENTS

| 727589 | 4/1955 | United Kingdom . |
| 1009397 | 10/1965 | United Kingdom . |
| 1297845 | 10/1972 | United Kingdom . |
| 1449507 | 9/1976 | United Kingdom . |

Primary Examiner—Willie G. Abercrombie
Attorney, Agent, or Firm—Finnegan, Henderson, Farabow, Garrett & Dunner

[57] ABSTRACT

A sausage skin storage and feeder apparatus comprises a storage container for storing a plurality of layers of shirred sausage casings, an upwardly sloping bottom wall in said container, a conveyor disposed along the bottom wall for transporting the bottom layer of casings upwardly to a discharge location, the upper layers of casings rolling backward in the container, a chute extending from the discharge location to a loading location opposite a stuffing horn and means for dispensing casings onto the stuffing horn.

20 Claims, 6 Drawing Figures

SAUSAGE SKIN STORAGE AND FEEDER APPARATUS FOR A SAUSAGE STUFFING MACHINE

This invention relates to a sausage skin storage and feeder apparatus for a sausage stuffing machine, comprising a storage container for storing a plurality of layers of sausage skins folded bellows-fashion in their longitudinal direction, dispenser means for dispensing individual sausage skins, and mounting means for automatically mounting a single sausage skin at a time on a stuffer barrel supplied with a plastically deformable mass such as minced meat, cheese or the like.

DE-OS No. 1,432,560 describes apparatus of this type, wherein a plurality of folded sausage skins, so-called "gut caterpillars" roll by gravity on a laterally limited, downwards inclined ramp towards a withdrawal opening located in the bottom of said ramp, whereat only one sausage skin at a time may be engaged by a pusher element to be pushed thereby transversely to its longitudinal axis into a mounting position defined by a further spring-biased pusher element, whereat a stuffer barrel is advanced into the sausage skin retained between the two pusher elements. The pusher elements gripping the sausage skin are then released, whereupon a sausage string may be formed by sequentially feeding metered portions of a stuffing mass and intermittently twisting the sausage skin until the latter is used up. The stuffer barrel has then to be retracted by its full length before a further sausage skin can be aligned in the mounting position.

This known storage and feeder apparatus operates satisfactorily, as long as relatively stiff synthetic sausage skins are employed and the operating speed is relatively low. This is only achieved, however, by a rather complicated structure of the apparatus, without precluding the occurrence of frequent malfunctions if a more tender sausage skin material is employed. Increasing the output of the machine would require the storage of a greater number of sausage skins, if frequent replenishment is to be avoided. The length of the feeder ramp cannot be significantly extended without incurring substantial functional drawbacks.

Experiments with a storage container adapted to contain several superimposed layers of sausage skins have not been successful, as the "gut caterpillars", even if folded very tightly, are not absolutely rigid structures adapted to be readily separated from one another. The employ of simple retaining means alone is by no means sufficient, if gut caterpillars of a tender and soft material are intended to roll down an inclined ramp while the upper layers are to be retained. In this case, the increased weight resting on the lower, still rather "wobbly" sausage skin bodies results in undesirable deformation thereof, which may lead to jamming adjacent the withdrawal location with the resultant operation hold-ups.

Proceeding from a storage and feeder apparatus of the type defined in the introduction, it is an object of the present invention to simplify and improve such apparatus in such a manner that sausage skins formed of a softer gut material, such as Collagen, may be reliably withdrawn from a larger storage container and individually mounted on the stuffer barrel.

In accordance with the invention, this object is achieved by providing power-operated conveyor means for positively and slowly advancing the lowermost layer of sausage skins transversely to their axial length on the bottom of the storage container over a distance corresponding to a multiple of the sausage skin diameter towards a withdrawal location, and by further providing return conveyor means for rearwardly conveying the further sausage skins resting on the lowermost layer.

In this manner it is firstly avoided that several layers of sausage skins slide downwards on an inclined surface, whereby they might be deformed by the mechanical engagement of retainer means. Secondly, the lowermost layer is positively guided transversely to the axial length of the sausage skins over a relatively long distance, resulting in accurate parallel alignment. This alignment remains undisturbed even after the sausage skins are released by the conveyor means upstream of the withdrawal location. It is also possible to achieve a certain prealignment in the upper layers, although the main function with respect to these layers is the rearward transport of the sausage skins with minimum deformation thereof, so that the weight resting on the lowermost layer is minimized at least adjacent the withdrawal location. In principle this could be achieved by mechanical means, more advantageous, however, is a pneumatic return conveyor means employing large-section blower nozzles operating at low pressure. In accordance with a particularly simple and reliable embodiment, the invention provides that the bottom of the storage container is upwardly inclined in the conveying direction of the power-operated conveyor means at an angle at least equal to the angle permitting the upper sausage skins to roll downwards under their own weight. As the power-operated conveyor means is adapted to convey upwards at any inclination, the above-named feature results in the sausage skins of the upper layers to return downwards on their own. In this case the stacking height of the sausage skins gradually decreases in the conveying direction, resulting in the aligning force acting on the lowermost sausage skins to increase correspondingly.

In an advantageous embodiment, a downward inclined guiding chute is provided between the bottom of the storage container and the withdrawal location, a bottom portion of said chute forming a mounting guide for mounting the lowermost sausage skin on the stuffer barrel. Particularly if said guiding chute is inclined at a very steep angle or even disposed vertical while being consistently filled with sausage skins, the parallel alignment of the sausage skins is safely maintained between its inlet and outlet ends. If the feeding of the sausage skins proceeds at a faster rate than the withdrawal thereof, the inlet end of the chute may be provided with a deflector or similar guide element for deflecting individual sausage skins of the lowermost layer upward, the deflected sausage skins then rolling down under their own weight.

The power-operated conveyor means may comprise a continuously driven endless conveyor loop provided with driver elements guided above the storage container bottom, preferably at a level marginally higher above said bottom than the half sausage skin diameter, so as to avoid on the one hand a lifting of the sausage skins of the lowermost layer off the container bottom, and on the other, engagement of the sausage skins of an upper layer.

Preferably there are provided two conveyor loops each at one side of the storage container and interconnected by conveying slats guided below the sidewalls of the storage container at a predetermined level above the container bottom. This spacing above the container bottom permits the slats to be of reduced thickness, for instance 0.15 to 0.35 of the sausage skin diameter. The reduced thickness of the conveyor slats permits them to be returned downwards through a relatively narrow slot at the end of the conveyor path without interferring with the further advance of the sausage skins, in any appreciable manner.

One of the two walls laterally delimiting the storage space may be rigidly connected to the container bottom, or other parts of the storage container, while the other wall should be mounted for adjustment normal to its plane. This latter wall may be a sidewall of the container or a partition mounted therein. Its adjustable mounting permits the width of the storage space to be adjusted to the length of the sausage skins to be stored, while the power-operated conveyor means need not be affected by such adjustment.

As the same lateral guidance of the sausage skins is also required in the guiding chute, the adjustable wall of the storage space may be provided with an extension projecting into the chute and defining one end thereof. This permits the adjustment of both the container and the guiding chute to be performed in a single operation.

As the sausage skins to be processed may be of varying diameters, and the sausage skin to be mounted on the stuffer barrel has to be aligned with its outer periphery between the guide members of the chute concentric with the stuffer barrel, the invention provides that the walls laterally defining the guiding chute are symmetrically adjustable with respect to its center plane relative to a container housing carrying the storage container, the lower or downstream end of the guiding chute being defined by a limit stop adjustable in the conveying direction. In this case at least the bottom of the storage container carrying the conveyor means should be coupled to the adjacent chute wall for adjustment together therewith. Preferably the storage container is bodily adjustable with respect to the container housing by having a return shaft of the conveyor loops slidably mounted in elongate openings. The bottom or limit stop of the guiding chute likewise has to be mounted for adjustment in a corresponding manner.

For further adjustments as may be required by specific properties of the sausage skins, particularly by the configuration of the ends thereof, the storage and feeder apparatus may be connected to the sausage stuffing machine by means of an appliance carrier permitting adjustment in at least one direction. In a preferred embodiment of the invention, the appliance carrier comprises a carrier tube having one of its ends fixedly attached to the sausage stuffing machine so as to be cantilevered therefrom parallel to a stuffer barrel located in the mounting position. The only modification of the sausage stuffing machine required in this case is the provision of fastening means for the carrier tube.

The container housing should be monted on the carrier tube for adjustment at least in the longitudinal direction thereof for taking into account the different end configurations of sausage skins. Preferably the container housing is also pivotable about the carrier tube between an operating position, in which the outlet end of the guiding chute is aligned with the stuffer barrel, and an inoperative position, in which the space in front of the stuffer barrel is freely accessible. This is of iportance in the case of a stuffing machine having only one rigidly mounted stuffer barrel, although even in the case of revolver stuffing machines it may occassionally be advisable to mount the sausage skins manually if only a small number of such skins are to be stuffed.

Closely above its bottom, or its end stop, respectively, the guiding chute should be provided with a discharge opening for pushing out the lowermost sausage skin contained therein, it having been ascertained that it is easily possible to push out in the axial direction the lowermost sausage skin of a stack of up to ten such skins contained in a vertical chute without causing any troubles in operation.

The sausage skins may be pushed out of the chute by means of a pusher assembly mounted for reciprocating motion parallel to the guiding chute and having a finger extending through a longitudinal slot in the chute for engancing the rear end of the lowermost sausage skin therein. The stuffer barrel may in this case be kept in a stationary position on the stuffing machine.

The finger of the pusher assembly is preferably designed as a pawl adapted to be automatically withdrawn from the guiding chute during the return stroke. Automatic withdrawal of the finger is accomplished by the second lowermost sausage skin in the chute descending to the bottom thereof while the lowermost skin is being pushed out, so that the finger is cammed out of the guiding chute by said descended sausage skin during the return stroke.

The operation of the pusher assembly may also be employed for controlling the operation of a wiper element mounted closely adjacent the end of the stuffer barrel for transverse movement relative thereto by means of a converter transmission connected therebetween. Since the more or less fluid sausage material is to a certain degree elastically compressible due to finely devided air inclusions, a limited amount of the material will always extrude from the open end of the stuffer barrel after the previously mounted sausage skin has been used up. On mounting a subsequent sausage skin on the stuffer barrel, the material extruded therefrom tends to soften the sausage skin, whereupon the softened portions may rupture due to the pressure created during the stuffing operation. The operation of the wiper element prior to mounting each sausage skin may prevent such rupture from occurring.

In an advantageous embodiment, the non-rotatable pusher member may be slidably guided on a rotatable guide shaft through the intermediary of a camming arrangement, said shaft being non-rotatably coupled to said wiper element. During each reciprocation of the pusher member, the wiper element is thus pivoted forward and backward closely adjacent the end of the stuffer barrel. To this effect, the cam structures of said camming arrangement are preferably located adjacent the respective end of the guide shaft.

The forward, preferably downward pivoting of the wiper element is carried out prior to a sausage skin being mounted on the stuffer barrel. The pusher member is retracted only after the stuffer barrel with the sausage skin mounted thereon has been indexed past the mounting position, whereby the wiper element is returned to its rest position at the end of the return stroke of the pusher member. At this instance a second stuffer barrel may already be aligned in the mounting position, preferably, however, the wiper element is returned to its rest position before said second stuffer barrel is in the mounting position, so that it does not come into contact with the end of said second barrel during its return movement. In any case, however, the wiper element is prevented from moving across the end of a mounted sausage skin and thus from causing damage thereto.

In the longitudinal direction of the guide shaft the wiper element may be located as closely as possible opposite the stuffing machine, preferably by being held in engagement with the carrier tube so as not to be affected by adjustments of the storage and feeder apparatus relative to the carrier tube and to maintain its adjustment relative to the end of the stuffer barrel.

The pusher member is preferably connected to the movable part of a fluid cylinder located within the carrier tube. Said movable part will normally be the piston rod, although a reversed arrangement is also possible. In this manner it is always possible to locate the control terminals of the fluid cylinder adjacent the fixed end of the carrier tube within the machine housing.

A preferred embodiment of the invention shall now be described with reference to the accompanying drawings, wherein:

FIGS. 1, 2, and FIGS. 1, 5, 6, respectively). Located adjacent the lower end of guiding chute 12 is a pusher assembly 76 (FIGS. 3, 4).

Storage container 1 is in the form of a funnel having a rear wall 77 rigidly connecting two sidewalls 78, 79, and a container bottom 2 suspended from sidewalls 78, 79 by means of angled brackets 54 to 57 in a manner to be described. A partition 69 defines an effective storage space within storage container 1 above bottom 2 thereof. Partition 69 is mounted for adjustment normal to its plane and locatable with respect to rear wall 77 by means of a clamping or detent device for adapting the width of storage space 81 to sausage skins 10 of different lengths.

Located at each side of container bottom 2 is a conveyor loop formed by a belt 4 and two belt pulleys 6-8. The upper belt pulleys 8 are rigidly attached to a common shaft 82 mounted for rotation in angled brackets 56 and 57 and a pair of bearing gussets 53 in fixed relation to container bottom 2.

Belt pulley 7 acts as a return pulley rotatably ther stop bar 61 is affixed to housing wall 33 along the center plane defined by stop bar 21.

Stop bars 21 and 61 serve for centering two threaded spindles 49, 50 interconnected by a toothed belt 52 so as to be simultaneously adjustable by means of a knob 51. Oppositely threaded end portions of spindles 49, 50 are in threaded engagement with chute walls 13, 14, so that turning of knob 51 causes chute walls 13, 14 to be symmetrically adjusted with respect to the vertical center plane of chute 12 extending in alignment with the axis of stuffer barrel 17.

Figure 1:
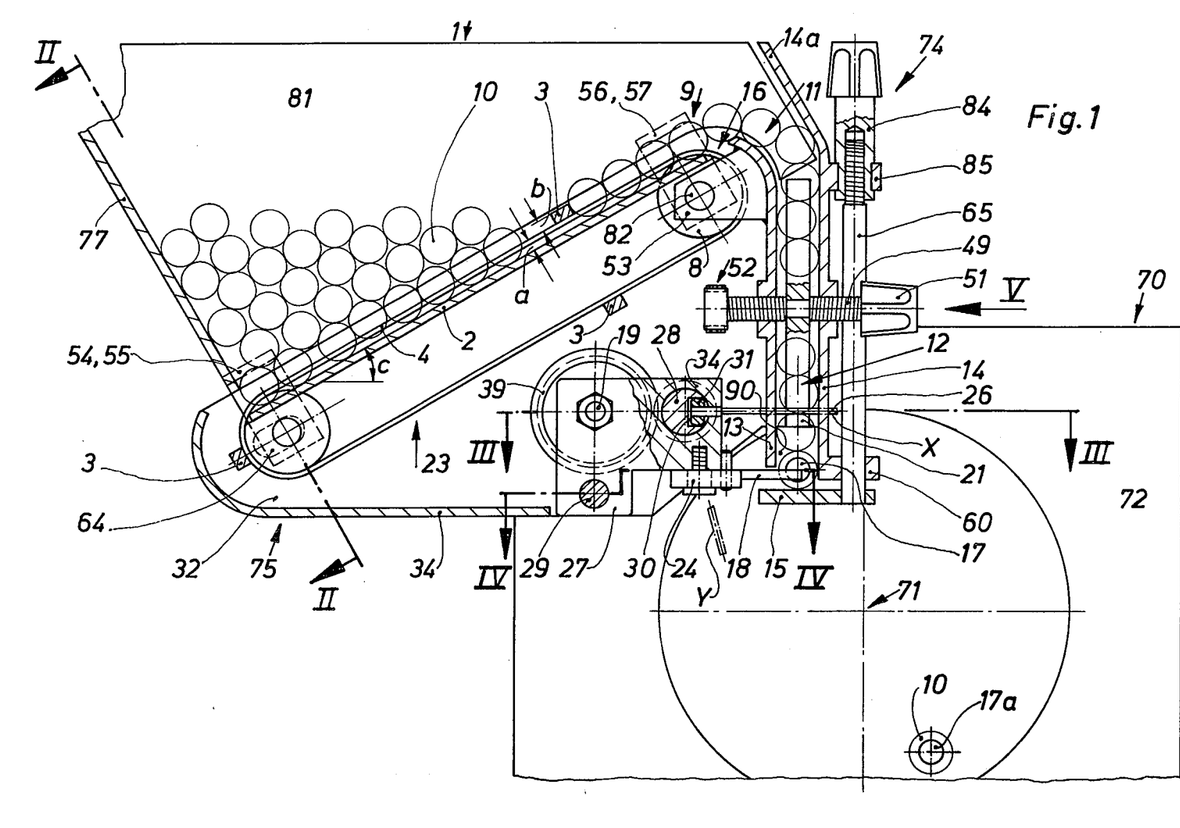
FIG. 1 shows a longitudinal section of a storage and thereto (cf.
Figure 2:
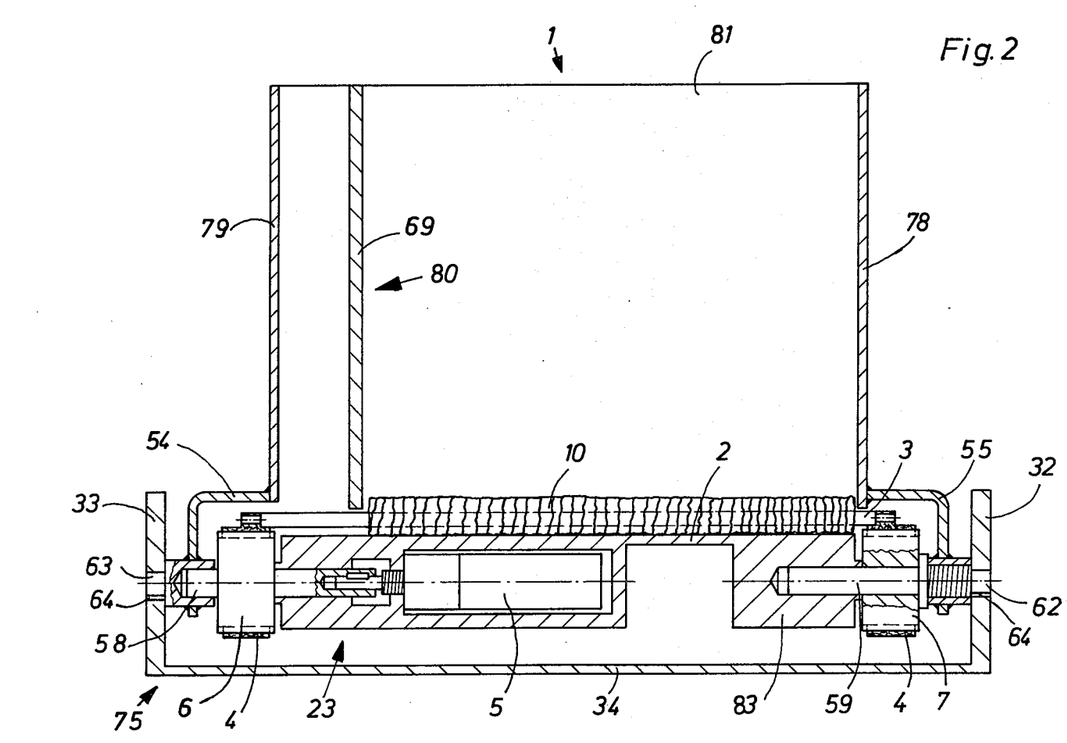
Figure 3:
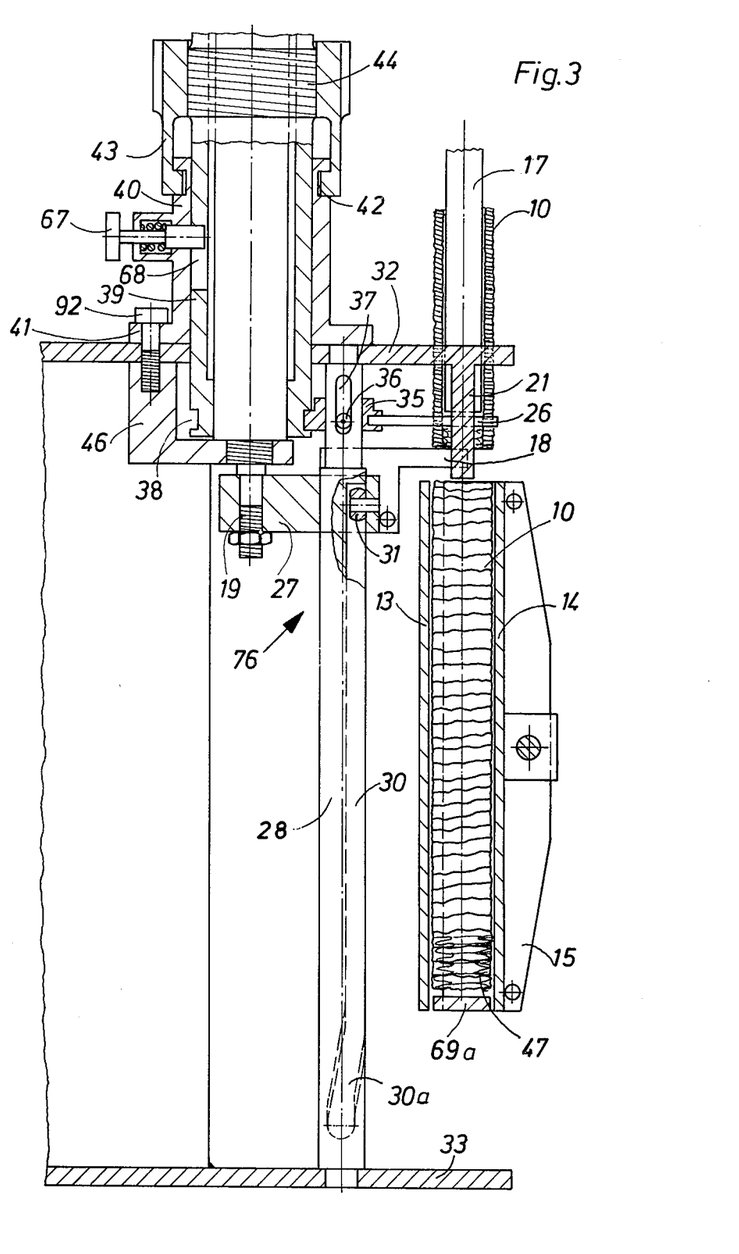
Figure 5:
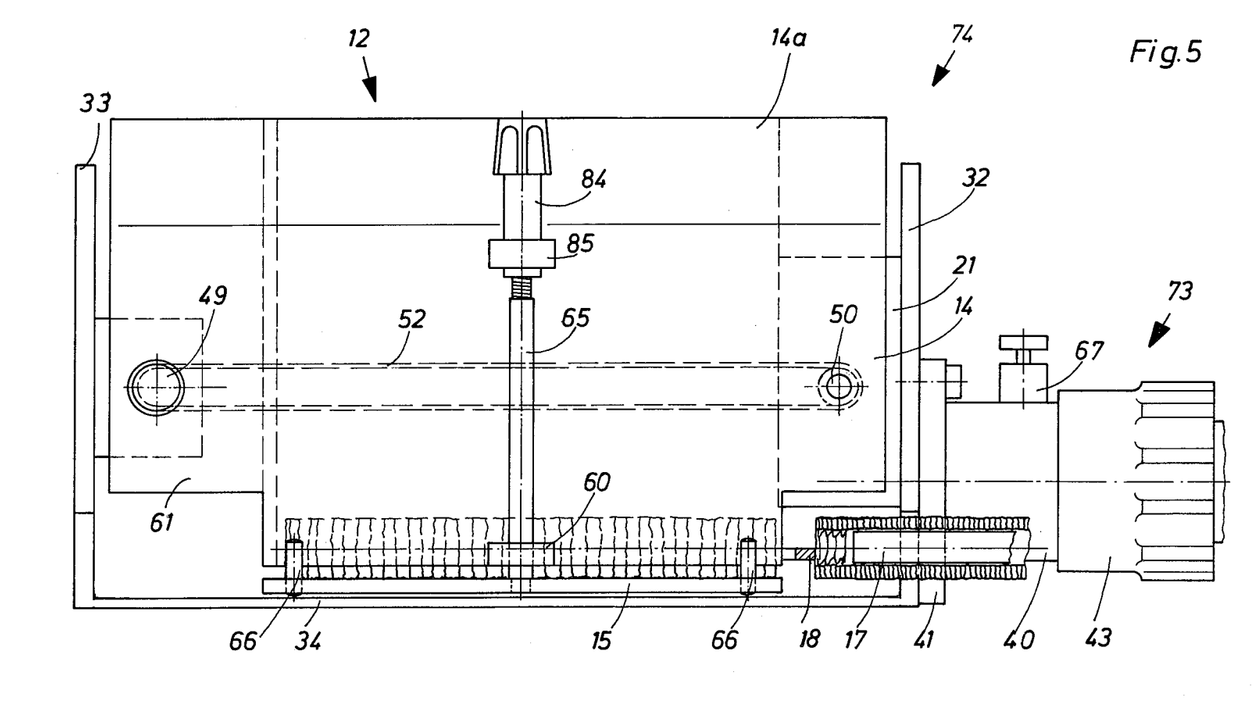
Figure 6:
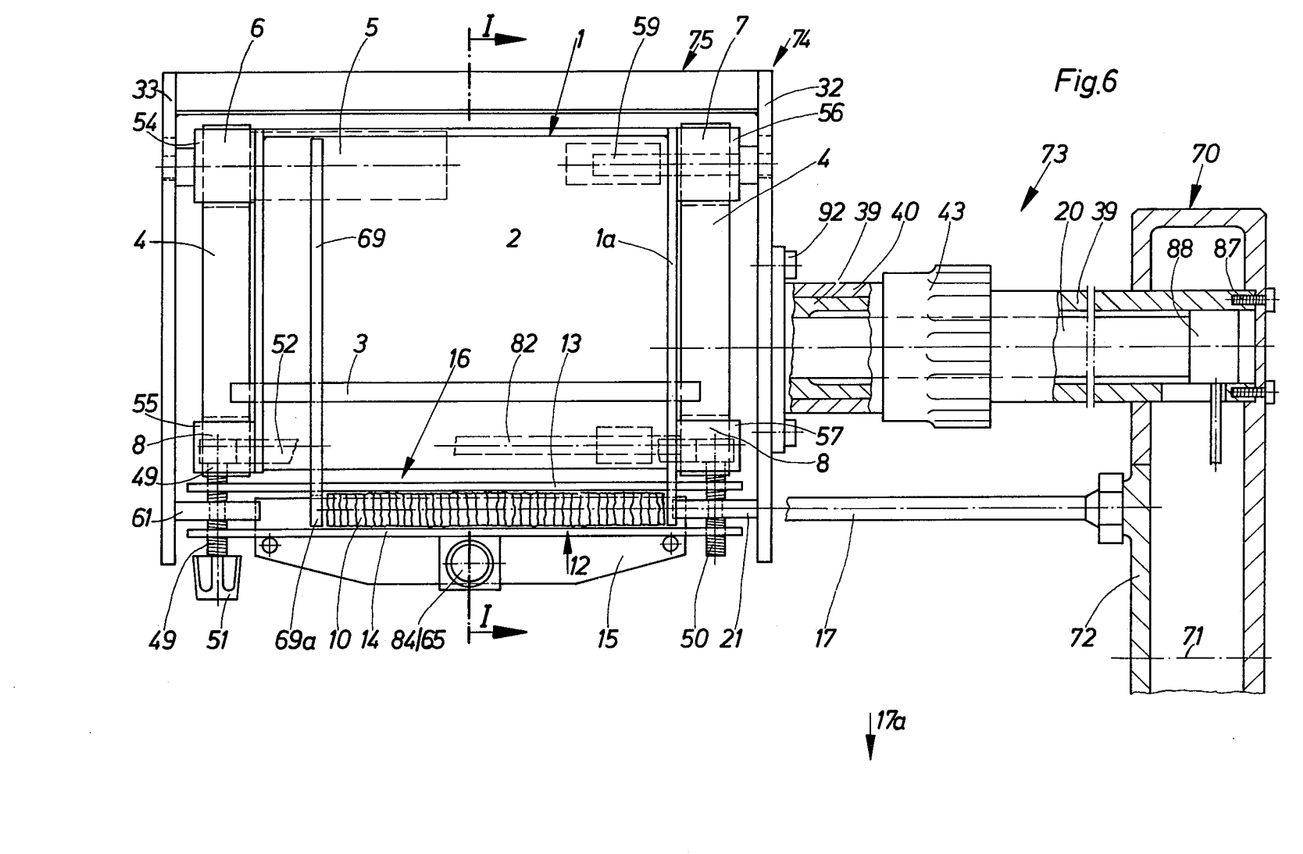

It is also required that the bar-shaped chute bottom 15 closing the lower end of guiding chute 12 be adjustable for aligning the lowermost sausage skin in chute 12 with the axis of stuffer barrel 17. To this effect, and as shown in FIGS. 1 and 5, there is provided a threaded spindle 65 the lower end of which is connected to chute bottom 15 and the threaded upper end of which is engaged by a threaded bushing 84 mounted for rotation in a bearing bracket 85 fixedly attached to chute wall 14. Chute bottom 15 is accurately guided by a slide bearing 60 receiving a lower portion of spindle 65 and by a pair of guide pins 66 located adjacent its ends.

The upper end of chute wall 13 is slightly bent towards container bottom 2 so as to define therewith a slot 16 for passage of conveyor slats 3. The width of slot 16 is only slightly greater than the thickness b of slats 3, so that the sausage skins 10 in layer 9 are readily conveyed from container bottom 2 to chute 12.

The angle of inclination c of container bottom 2 with respect to the horizontal is by about 10 to 20% greater than the flow angle enabling sausage skins disposed above a lowermost layer to roll downwards without the aid of additional means. As long as the storage container 1 is not filled up to its brim, it is thus ensured that there are no further sausage skins superimposed on bottom layer 9 adjacent inlet opening 11 of guiding chute 12.

Experiments have shown that a particularly exact alignment of sausage skins in the bottom layer is accomplished by a substantially uniform movement of the conveyor slats at a speed of about 1 cm/sec. While the sausage skins are intermittently withdrawn from the guiding chute, the supply of further sausage skins thereto is carried out in a continuous manner at a substantially constant speed. Moreover, the supply speed has to be somewhat greater than the average withdrawal speed. This implies that individual sausage skins have to be removed from the bottom layer 9 prior to entering the guiding chute for return to the rear portion of the container. This is accomplished by an upper extension 14a of chute wall 14 projecting above guiding chute 12 and effective to lift surplus sausage skins, so that they can roll back in the manner described.

The power-operated upwards directed conveyance of the lowermost sausage skin in combination with the return of the upper or surplus sausage skins along the inclined plane by rolling over the lowermost layer reliably prevent the creation of excessive forces acting on the sausage skins. It has even be ascertained that the once established parallel alignment is not significantly disturbed during the return movement, so that the alignment forces during the subsequent conveying step remain rather low. Careful treatment of the sausage skins is further insured by the smooth configuration of the conveyor slats over their full length.

The carrier tube 39 of carrier assembly 73 has its rear end closely fitted in a bore of machine housing 70 and is rigidly attached thereto by means of bolts 87. Its forward end projects through a bore of the housing sidewall and carries a longitudinally slidable flanged sleeve 40, the flange 41 of which is fixedly attached to housing sidewall 32 by means of bolts 92. Sleeve 40 carries a spring-biased detent pin 67 engaging a longitudinal groove 68 of carrier tube 39. A further longitudinal groove formed in carrier tube 39 at an offset angle of about 60° with respect to the first-named groove 68 enables the apparatus to be bodily rotated in the counterclockwise direction as seen in FIG. 1 to a position at which the free end of stuffer barrel 17 is accessible for manually mounting sausage skins thereon.

Coupling of the flanged sleeve 40 with carrier tube 39 is accomplished by means of a nut 43 engaging threads 44 on carrier tube 39 and having an inwardly projecting flange received in an annular groove 42 of sleeve 40. Rotation of nut 43 thus permits the apparatus to be bodily adjusted in the longitudinal direction of carrier tube 39 and thus of stuffer barrel 17. This adjustment is required for adaptation to different lengths of a closure 47 provided at one end of the sausage skins, as will be explained in detail hereunder.

Located within carrier tube 39 is a double-acting pneumatic cylinder 20 the terminal 88 of which for connection to associated fluid ducts is disposed to the rear within machine housing 70. In the axial direction cylinder 20 is retained by two circlips within a mounting block 46 fixedly attached to housing wall 32 by means of some of the bolts 92.

Figure 4:
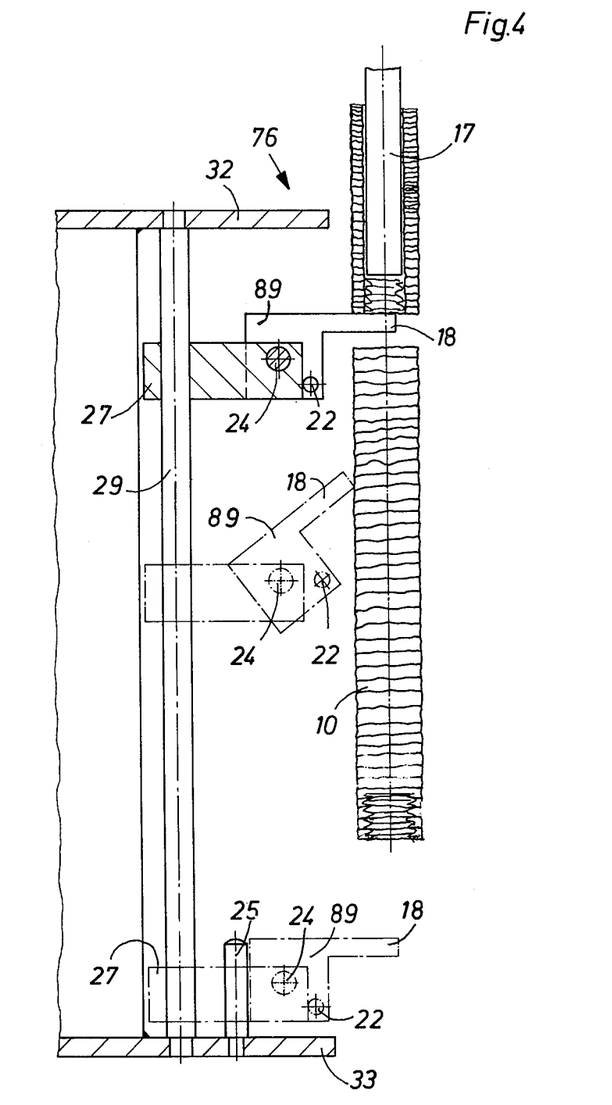

The free end of the piston rod 19 of pneumatic cylinder 20 is connected to a pusher member 27 of pusher assembly 76. Pusher member 27 is guided on a shaft 28 and on a rod 29 extending parallel to carrier tube 39 between housing sidewalls 32 and 33. Mounted on pusher member 27 for pivotal movement about a pivot pin 24 is a pusher pawl 89. A stop pin 22 projecting from pawl 89 is adapted to engage one end surface of pusher member 27 to support pawl 89 in its operating position shown in solid lines in FIG. 4, above. In this position of pawl 89, a finger 18 connected thereto extends underneath chute wall 13 into guiding chute 12 a short distance above chute bottom 15, as shown in FIG. 1. On retraction of piston rod 19, finger 18 thus engages the rear end of the lowermost sausage skin 10 in chute 12 to push it out in horizontal direction through an outlet opening 90 formed below stop bar 21 and onto stuffer barrel 17.

During this operation the remaining sausage skins 10 in chute 12 descend by one step. For the subsequent return movement of pusher member 27, finger 18 is thus cammed to the dot-dash-position shown in FIG. 4, below, by the sausage skin 10 in the lowermost position. Immediately prior to its arrival at its rear end position, pawl 89 strikes a stopper pin 25, whereby it is returned to its operating position by clockwise rotation.

A roller 31 rotatably mounted within pusher member 27 is guided in a groove 30 formed in shaft 28. Along the operating path of the pusher member groove 30 extends parallel to the shaft's axis. At the end portion of shaft 28 facing away from the machine, there is a section 30a of groove 30 extending along a helical path and effective for rotating shaft 28 by an angle of about 60°. At its end portion facing towards the machine, shaft 28 carries a bushing 35 slidably and non-rotatably connected thereto by a pin and slot connection 36, 37. Bushing 35 carries a wiper member 26 and is engaged with an annular groove 38 formed in carrier tube 39, so that wiper member 26 is safely retained a short axial distance away from the free end of stuffer barrel 17 irrespective of the axial adjustment of the storage and feeder apparatus. As the pusher member 27 starts to move from its rear end position, wiper member 26 is thus rotated downwards from its position X shown in FIG. 1 to the position Y in the same figure. In this manner it is ensured that the stuffing material extruded from the free end of the stuffer barrel due to elastic expansion is downwards removed therefrom prior to mounting a sausage skin thereon.

Operation of the apparatus described is initiated by adjusting partition 69 to the length of the sausage skins to be processed, whereupon storage container 1 is filled with sausage skins 10 of the selected type to a level just below the inlet opening 11 of guiding chute 12. By rotating nut 43 the apparatus is then adjusted to the length of the sausage skin closures 47, and the chute walls 13, 14 and bottom 15 are adjusted to the outer diameter of the sausage skins by rotating knobs 51 and 84, respectively.

After preparation of the stuffer machine for operation, conveyor means 23 may be started by a signal from the machine. As long as guide chute 12 is still empty, operation of the pusher assembly 76 may be inhibited by a sensor switch (not shown). This sensor switch may be responsive to the arrival of the first sausage skin 10 on chute bottom 15. The piston rod 19 of pneumatic cylinder 20 is in its extended position, and the finger 18 of pusher member 27 projects into guiding chute 12 in spaced relation to the rear end of the lowermost sausage skin 10.

The stuffing machine generates an actuation signal for the pusher assembly shortly prior to indexing the revolving head 72. By thus removing the extruded stuffing material from the stuffer barrel immediately prior to mounting a sausage skin thereon it is possible to avoid a longer interval during which more material could extrude before the barrel is indexed to the stuffing position. Stuffing of the sausage skin is initiated immediately after the barrel has been indexed to the operating position.

The actuation signal generated by the machine causes piston rod 19 to be retracted, with the roller 31 of pusher member 27 engaging the helical section 30a of groove 30, so that wiper member 26 is rotated from its horizontal position X to its downwards inclined position Y to remove extruded stuffing material from the end of barrel 17. The removed material may drop into a receptacle (not shown) below wiper member 26.

Only after wiper member 26 has reached its lower position Y, finger 18 engages the rear end of the lowermost sausage skin 10 to push it out through opening 90 and onto stuffer barrel 17. Indexing of the revolving head 72 is then started while finger 18 is still in its forward end position. After head 72 has been indexed by an angle of about 40°, cylinder 20 is again actuated to extend piston rod 19. Shortly before pusher member 27 arrives at its rear end position, engagement of roller 31 with groove section 30a causes wiper member 26 to be rotated back to its starting position X, whereupon the other stuffer barrel 17a arrives at the mounting position.

In this context it is important that the newly arrived stuffer barrel 17a is not wiped by the wiper member during its rotation from Y to X. This ensures that the wiper member retained in its horizontal position is substantially dry, and that the stuffer barrel is not contaminated with material removed therefrom.

The stuffing or metering extruder is started immediately after a stuffer barrel with a new sausage skin mounted thereon has been indexed to the operating position. It is then stopped again as soon as the sausage skin mounted on the respective barrel has been completely filled, which may be determined in a per se known manner by the use of sensors effective to initiate the next mounting and indexing operation. After the last sausage skin has been withdrawn from guiding chute 12 the sensor switch associated therewith generates a signal to stop the machine.

We claim:

1. A sausage skin storage and feeder apparatus for a sausage stuffing machine, comprising a storage container for storing a plurality of layers of sausage skins folded bellows-fashion in their longitudinal direction, said storage container having a bottom wall, power-operated conveyor means for slowly advancing the lowermost layer of sausage skins in said container transversely of their length over a distance corresponding to a multiple of their diameter in a first direction along the bottom wall of the storage container toward a withdrawal location at the end of the container, the bottom wall of the container being upwardly inclined in the first direction at an angle to the horizontal at least equal to a flow angle permitting the sausage skins overlying the lowermost layer to roll backwards in said container in a second direction opposite said first direction, a chute extending from said withdrawal location to a location adjacent a stuffer barrel for receiving the lowermost layer of sausage skins from the conveyor means and for storing a plurality of sausage skins, means for dispensing individual sausage skins from the chute and for mounting them one at a time on the stuffer barrel, and means in said container adjacent said withdrawal location for removing surplus sausage skins and causing them to be conveyed in said second direction in said container when said chute is filled with sausage skins.

2. Apparatus according to claim 1, including guide means forming a bottom of said chute for guiding the lowermost sausage skin in said chute onto said stuffer barrel.

3. Apparatus according to claim 1, said power-operated conveyor means comprising a substantially continuously driven endless conveyor loop provided with conveying members guided above the container bottom wall.

4. Apparatus according to claim 3, said storage container including a pair of sidewalls, said power-operated conveyor means including two conveyor loops, one at each side of the storage container, said loops being interconnected by conveyor slats guided below the sidewalls at a level above said bottom wall.

5. Apparatus according to claim 4, one of said sidewalls being stationary with respect to said bottom wall, the other of said sidewalls being adjustable normal to its plane and toward and away from said one sidewall.

6. Apparatus according to claim 5, said adjustable sidewall having an extension extending into said chute and defining one end thereof.

7. Apparatus according to claim 1, said chute including two chute walls connected to a storage housing and adjustable symmetrically relative to a center plane, and an end stop forming the bottom of said chute and adjustable relative thereto.

8. Apparatus according to claim 7, said container bottom wall being coupled to said chute for adjustment together therewith.

9. Apparatus according to claim 8, said storage container being mounted for adjustment relative to said storage housing by means of slot-and-spigot guides.

10. Apparatus according to claim 7, said storage and feeder apparatus being mounted on a stuffing machine by means of a carrier assembly for adjustment relative thereto.

11. Apparatus according to claim 10, said carrier assembly including a cantelever carrier tube fixedly attached at one end to said sausage stuffing machine and having its other end projecting therefrom parallel to said stuffer barrel.

12. Apparatus according to claim 11, said storage housing being adjustable in a longitudinal direction of said carrier tube and rotatable about a longitudinal axis thereof from an operating position in which the bottom of said chute is aligned with the stuffer barrel, to a rest position in which the front of said stuffer barrel is freely accessible.

13. Apparatus according to claim 7, said chute having a discharge opening closely above said end stop allowing said sausage skins to be dispensed from said chute.

14. Apparatus according to the claim 13 including a reciprocating pusher assembly movable through a forward and return stroke and mounted parallel to said chute and having a finger projecting through a longitudinal slot in said chute for engaging the rear end of the lowermost sausage skin in said chute.

15. Apparatus according to claim 14, said pusher assembly including a pivotable pawl member operable to automatically pivot said finger out of said chute during the return stroke of said pusher member.

16. Apparatus according to claim 14, said pusher assembly being connected to a wiper member by way of a convertor transmission operable to control lateral displacement of said wiper member closely adjacent the end of said stuffer barrel.

17. Apparatus according to claim 16, said pusher assembly being non-rotatable and mounted for longitudinal sliding movement on a rotatable guide shaft connected thereto through a cam transmission means and circumferentially coupled to said wiper member.

18. Apparatus according to claim 17, said wiper member being retained in the longitudinal direction of said guide shaft at a stationary position relative to said stuffer barrel.

19. Apparatus according to claim 14, including a cylinder disposed in said carrier tube, a piston rod slidable in said cylinder and movable in response to fluid pressure in said cylinder, said pusher assembly being connected to said piston rod.

20. Apparatus according to claim 1, said surplus sausage skin removing means including an upwardly inclined member projecting above said chute.

* * * * *